US012225130B2

(12) United States Patent
Liu

(10) Patent No.: US 12,225,130 B2
(45) Date of Patent: Feb. 11, 2025

(54) EMBEDDED TLS PROTOCOL FOR LIGHTWEIGHT DEVICES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 5 days.

(21) Appl. No.: 17/576,889

(22) Filed: Jan. 14, 2022

(65) Prior Publication Data
US 2023/0231712 A1    Jul. 20, 2023

(51) Int. Cl.
*H04L 9/30* (2006.01)
*H04L 9/08* (2006.01)
*H04L 9/32* (2006.01)

(52) U.S. Cl.
CPC .......... *H04L 9/3066* (2013.01); *H04L 9/088* (2013.01); *H04L 9/3263* (2013.01)

(58) Field of Classification Search
CPC ..... H04L 9/3066; H04L 9/088; H04L 9/3263; H04L 9/0866; H04L 9/40; H04L 63/0428; H04L 63/06; H04L 63/0823; H04L 9/0844
See application file for complete search history.

(56) References Cited

U.S. PATENT DOCUMENTS

| | | | | | |
|---|---|---|---|---|---|
| 6,085,320 | A * | 7/2000 | Kaliski, Jr. | ............ | G07F 7/1008 713/168 |
| 6,704,871 | B1 * | 3/2004 | Kaplan | .................. | G06F 21/74 713/192 |
| 7,965,701 | B1 * | 6/2011 | Toennis | .............. | H04L 63/1441 713/160 |
| 9,954,848 | B1 * | 4/2018 | Stoica | .................... | H04L 9/0863 |
| 10,129,223 | B1 * | 11/2018 | Bhattacharyya | ...... | H04L 9/0861 |
| 10,374,809 | B1 * | 8/2019 | Dasarakothapalli | ...... | H04L 9/30 |
| 11,153,080 | B1 * | 10/2021 | Nix | ........................ | H04L 9/3093 |
| 11,233,636 | B1 * | 1/2022 | Peddada | ............... | H04L 9/0841 |
| 11,316,685 | B1 * | 4/2022 | Doherty | ............... | H04L 9/0833 |

(Continued)

FOREIGN PATENT DOCUMENTS

| | | | | |
|---|---|---|---|---|
| CA | 2795428 A1 * | 6/2013 | ............ | G06F 21/44 |
| CN | 101127107 A * | 2/2008 | ............ | H04L 9/321 |

(Continued)

OTHER PUBLICATIONS

Rakel Haakegaard and Joanna Lang, "The Elliptic Curve Diffie-Hellman (ECDH)", Dec. 2015, 4 pages (Year: 2015).*

*Primary Examiner* — Shahriar Zarrineh
(74) *Attorney, Agent, or Firm* — Greenberg Traurig

(57) ABSTRACT

The disclosure relates to improvements in secure channel establishment. In some aspects, the techniques described herein relate to a method including: issuing, by a client device to a server, a request to establish a secure connection; receiving, by the client device, a response to the request to establish a secure connection from the server, the response including a digital certificate associated with a public key stored by the server, the public key used to establish a symmetric key; validating, by the client device, the digital certificate; and computing, by the client device, a shared secret using the public key stored by the server and a private key generated by the client device.

17 Claims, 4 Drawing Sheets

(56) References Cited

U.S. PATENT DOCUMENTS

| | | | |
|---|---|---|---|
| 11,777,719 B2* | 10/2023 | Nix | H04L 9/0869 713/171 |
| 11,943,343 B2* | 3/2024 | Nix | H04L 9/085 |
| 2002/0095569 A1* | 7/2002 | Jerdonek | H04L 9/3263 380/279 |
| 2003/0035547 A1* | 2/2003 | Newton | H04L 9/0625 380/279 |
| 2003/0163701 A1* | 8/2003 | Ochi | H04L 9/321 713/175 |
| 2004/0117626 A1* | 6/2004 | Andreasyan | H04L 9/0844 713/175 |
| 2004/0243805 A1* | 12/2004 | Enokida | H04L 9/0891 713/175 |
| 2006/0174018 A1* | 8/2006 | Zhu | H04L 63/0823 709/228 |
| 2008/0306875 A1* | 12/2008 | Mardikar | H04L 63/061 705/71 |
| 2010/0228968 A1* | 9/2010 | Wason | H04L 9/3263 713/169 |
| 2011/0296185 A1* | 12/2011 | Kamarthy | H04L 63/1441 713/168 |
| 2012/0023336 A1* | 1/2012 | Natarajan | H04L 9/0841 713/179 |
| 2012/0209951 A1* | 8/2012 | Enns | H04L 69/28 709/217 |
| 2013/0166907 A1* | 6/2013 | Brown | H04L 9/3268 713/156 |
| 2013/0268755 A1* | 10/2013 | Simmons | H04L 63/0823 713/156 |
| 2015/0067338 A1* | 3/2015 | Gero | H04L 63/061 713/171 |
| 2015/0095648 A1* | 4/2015 | Nix | H04L 9/0894 713/170 |
| 2015/0200774 A1* | 7/2015 | Le Saint | H04W 12/041 713/171 |
| 2016/0013935 A1* | 1/2016 | Pahl | H04L 9/321 713/171 |
| 2016/0302061 A1* | 10/2016 | Park | H04L 9/0866 |
| 2017/0134346 A1* | 5/2017 | Pahl | H04L 63/062 |
| 2017/0195298 A1* | 7/2017 | Brand | H04L 9/0891 |
| 2017/0324548 A1* | 11/2017 | Anshel | H04L 9/0844 |
| 2018/0323969 A1* | 11/2018 | Pahl | H04L 9/321 |
| 2018/0351941 A1* | 12/2018 | Chhabra | H04L 63/08 |
| 2018/0375663 A1* | 12/2018 | Le Saint | H04L 9/3247 |
| 2019/0097982 A1* | 3/2019 | Bhattacharyya | H04L 9/14 |
| 2019/0327220 A1* | 10/2019 | Huber | H04L 63/18 |
| 2019/0329056 A1* | 10/2019 | Sjoquist | A61N 1/3987 |
| 2020/0015087 A1* | 1/2020 | Pak | H04W 12/03 |
| 2020/0067708 A1* | 2/2020 | Subba | H04L 9/3226 |
| 2020/0295921 A1* | 9/2020 | Nguyen | H04L 67/55 |
| 2021/0184863 A1* | 6/2021 | Shahin | H04L 9/3239 |
| 2021/0344667 A1* | 11/2021 | Huston, III | H04L 63/126 |
| 2022/0029790 A1* | 1/2022 | Peddada | H04L 9/0891 |
| 2022/0038278 A1* | 2/2022 | Gray | H04L 9/14 |
| 2022/0131686 A1* | 4/2022 | Chhodavdia | H04L 9/0844 |
| 2022/0209944 A1* | 6/2022 | Nix | H04L 9/0861 |

FOREIGN PATENT DOCUMENTS

| | | | | |
|---|---|---|---|---|
| CN | 102158860 A | * | 8/2011 | H04W 12/06 |
| CN | 107852404 A | * | 3/2018 | H04L 63/0428 |
| CN | 108833431 A | * | 11/2018 | H04L 63/0807 |
| CN | 105429760 B | * | 12/2018 | |
| CN | 109088870 A | * | 12/2018 | H04L 63/0209 |
| CN | 109347809 A | * | 2/2019 | H04L 63/0435 |
| CN | 110912707 A | * | 3/2020 | G06Q 40/04 |
| CN | 111740989 A | * | 10/2020 | H04L 63/0435 |
| CN | 112311531 A | * | 2/2021 | |
| CN | 112565213 A | * | 3/2021 | G06F 21/45 |
| CN | 113315636 A | * | 8/2021 | H04L 9/0844 |
| CN | 114499913 A | * | 5/2022 | H04L 63/0281 |
| EP | 2073430 B1 | * | 7/2013 | H04L 9/0844 |
| EP | 3291481 A1 | * | 3/2018 | H04L 9/002 |
| EP | 3361695 A1 | * | 8/2018 | H04L 63/0227 |
| EP | 3694141 A1 | * | 8/2020 | G06Q 10/0833 |
| IN | 201841043622 A | * | 5/2020 | |
| TW | 1748925 B | * | 12/2021 | |
| WO | WO-2019179608 A1 | * | 9/2019 | H04L 67/306 |
| WO | WO-2021136511 A1 | * | 7/2021 | H04L 63/0823 |
| WO | WO-2022067132 A1 | * | 3/2022 | H04L 9/0618 |

* cited by examiner

EMBEDDED TLS PROTOCOL FOR LIGHTWEIGHT DEVICES

FIELD OF THE TECHNOLOGY

At least some embodiments disclosed herein relate generally to semiconductor devices and, in particular, to improving secure communications between semiconductor devices using cryptography.

BACKGROUND

Some memory devices may store cryptographic keys to perform cryptographic operations. During a secure communications session, two parties to the session may be required to perform various asymmetric cryptographic operations (e.g., key generation, encryption, decryption, etc.). When one device is low-powered or lacking resources, such operations may be infeasible or impossible.

DETAILED DESCRIPTION

Figure 1:
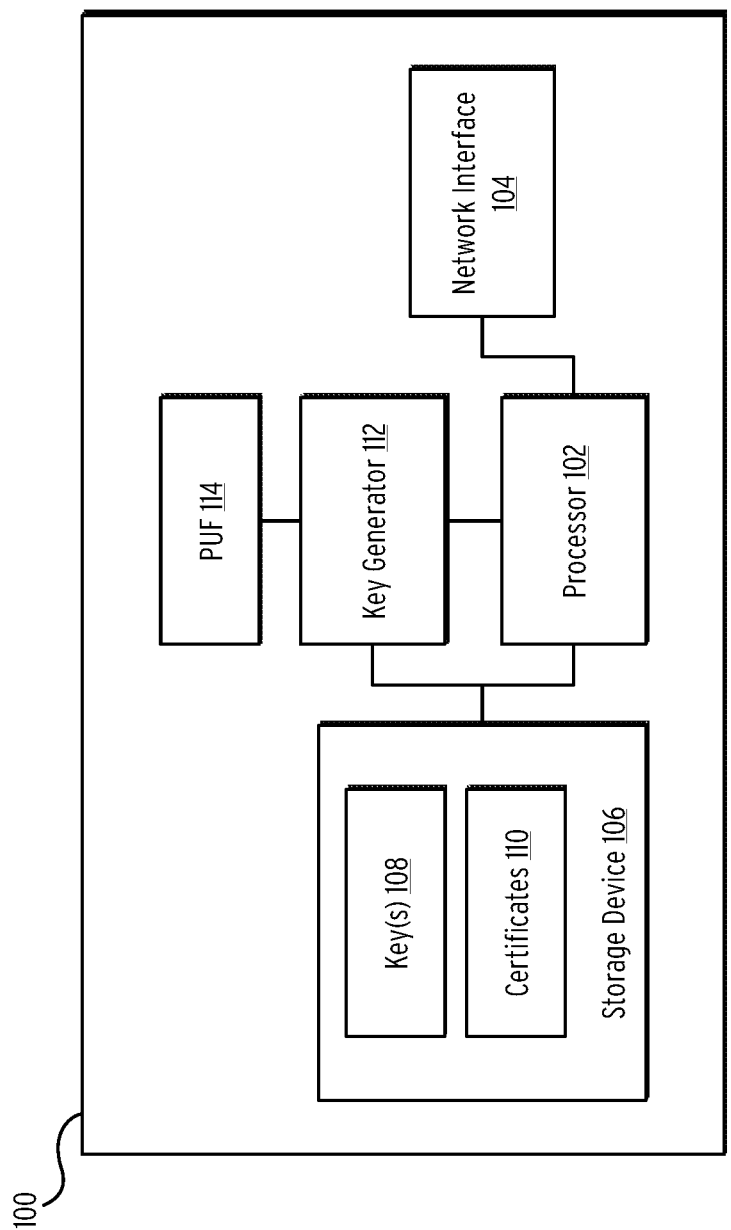
FIG. 1 is a block diagram of a memory device according to some of the example embodiments.

In a transport layer security (TLS) session, two devices agree upon an encryption key to encrypt and decrypt data transmitted during the session. In some embodiments, this encryption key comprises a shared (often symmetric) key independently generated by the client and the server. As such, the shared key is not able to be intercepted by third parties.

During the establishment of the TLS session, a handshake procedure is undertaken where the devices communicate information allowing them to generate the shared key. Two key exchange algorithms, Diffie-Hellman (DH) and Elliptic Curve DH (ECDH), can be used and two algorithms Rivest-Shamir-Adleman (RSA) and Elliptic Curve Digital Signature Algorithm (ECDSA) can be used to authenticate the communication. Such protocols generally rely on stored private key data when establishing a secure channel. Storage of private keys can be expensive and prone to data leakage, either unintentionally or due to malicious actors. To remedy these issues, an ephemeral DH (DHE) key exchange protocol can be used. DHE differs from DH in that DHE utilizes a temporary private key for each connection. Thus, the private key used during a given handshake is never re-used, allowing for forward secrecy (i.e., if the long-term private key of the server gets leaked, past communication is still secure).

During a DHE handshake, the devices transmit data between each other. In response to an initiating message (e.g., ClientHello), a server will transmit a response message (e.g., ServerHello) that includes a digital certificate, DH parameters (e.g., G, N, and $G^x$), and a digital signature generated using the DH parameters. In some embodiments, the digital certificate can comprise a certificate generated for an ECDSA key pair. in some embodiments, the server generates the digital signature with the ECDSA private key corresponding to the ECDSA public key in the SSL certificate. Using the digital certificate in the server response, the client can confirm the server is using the proper public key. Further, the client can confirm that the server holds the proper private key by validating the digital signature (against the DH parameters) using the public key in the digital certificate.

After verifying the identity of the server, the client sends its own DH parameter to the server. Thus, at this stage, both the client and the server have copies of the two (client, server) DH parameters. From these two DH parameters, the client and server can independently generate a premaster secret. Finally, the client and server can independently generate session keys using the premaster secret, client random, and server random. The session key can then be used to encrypt data, in both directions, during the session.

While a DHE handshake protocol enables forward secrecy and secure communications, these benefits come at a computational cost. Specifically, the use of asymmetric cryptography is computationally expensive and requires non-negligible computing power. While such costs may be bearable for higher-powered devices (e.g., commercial servers, laptops, desktops, etc.), lightweight devices often do not have the resources to efficiently perform such operations. For example, Internet-of-Things (IoT) devices often have minimal storage capacity and slower processing elements. Asymmetric cryptographic operations (e.g., encryption, decryption, signature validation, etc.) can often consume all of these resources or a significant portion. In the worst case, such devices simply cannot perform asymmetric cryptography operations and will fail to establish secure sessions. In such a scenario, such devices may revert to insecure communications channels (thus exposing data) or may simply stop responding. Given the critical nature of many IoT devices (e.g., in medical, manufacturing, or similar environments), such failures can be fatal.

As such, there exists a need to allow for secure communications with lightweight devices while retaining the benefits of secure protocols such as the DHE key exchange protocol.

The following embodiments modify a TLS handshake to reduce the number of asymmetric encryption operations required to establish a secure connection. Specifically, a server device stores an Elliptic-Curve Diffie-Hellman (ECDH) public-private key pair and generates and/or stores a digital certificate for the ECDH key pair. When responding to a ClientHello, or similar message, the server includes the ECDH certificate instead of an ECDSA certificate (or similar certificate). The client can then use the ECDH certificate to obtain the public ECDH key of the server. The ECDH certificate can also function as a digital signature of the server. The client can then use the ECDH public key of the server to generate a symmetric key, and the server can also independently generate the same symmetric key.

In some aspects, the techniques described herein relate to a method including issuing, by a client device to a server, a request to establish a secure connection; receiving, by the client device, a response to the request to establish a secure connection from the server, the response including a digital certificate associated with a public key stored by the server, the public key used to establish a symmetric key; validating, by the client device, the digital certificate; and computing, by the client device, a shared secret using the public key stored by the server and a private key generated by the client device.

In some aspects, the techniques described herein relate to a method, wherein the request to establish a secure connection includes a ClientHello message using a TLS protocol.

In some aspects, the techniques described herein relate to a method, wherein the public key stored by the server includes an ECDH public key.

In some aspects, the techniques described herein relate to a method, wherein the digital certificate associated with a public key stored by the server is signed by a trusted certificate authority.

In some aspects, the techniques described herein relate to a method, further including generating a second digital certificate for a client public key corresponding to the private key generated by the client device and transmitting the second digital certificate to the server after validating the digital certificate received from the server.

In some aspects, the techniques described herein relate to a method, further including encrypting, by the client device, a session communication using the shared secret.

In some aspects, the techniques described herein relate to a non-transitory computer-readable storage medium for tangibly storing computer program instructions capable of being executed by a computer processor, the computer program instructions defining steps of: issuing, by a client device to a server, a request to establish a secure connection; receiving, by the client device, a response to the request to establish a secure connection from the server, the response including a digital certificate associated with a public key stored by the server, the public key used to establish a symmetric key; validating, by the client device, the digital certificate; and computing, by the client device, a shared secret using the public key stored by the server and a private key generated by the client device.

In some aspects, the techniques described herein relate to a non-transitory computer-readable storage medium, wherein the request to establish a secure connection includes a ClientHello message using a TLS protocol.

In some aspects, the techniques described herein relate to a non-transitory computer-readable storage medium, wherein the public key stored by the server includes an ECDH public key.

In some aspects, the techniques described herein relate to a non-transitory computer-readable storage medium, wherein the digital certificate associated with a public key stored by the server is signed by a trusted certificate authority.

In some aspects, the techniques described herein relate to a non-transitory computer-readable storage medium, further including generating a second digital certificate for a client public key corresponding to the private key generated by the client device and transmitting the second digital certificate to the server after validating the digital certificate received from the server.

In some aspects, the techniques described herein relate to a non-transitory computer-readable storage medium, further including encrypting, by the client device, a session communication using the shared secret.

In some aspects, the techniques described herein relate to a device including: a processor configured to: issue, to a server, a request to establish a secure connection; receiving a response to the request to establish a secure connection from the server, the response including a digital certificate associated with a public key stored by the server, the public key used to establish a symmetric key; validating the digital certificate; and computing a shared secret using the public key stored by the server and a private key generated by the client device.

In some aspects, the techniques described herein relate to a device, wherein the request to establish a secure connection includes a ClientHello message using a TLS protocol.

In some aspects, the techniques described herein relate to a device, wherein the public key stored by the server includes an ECDH public key.

In some aspects, the techniques described herein relate to a device, wherein the digital certificate associated with a public key stored by the server is signed by a trusted certificate authority.

In some aspects, the techniques described herein relate to a device, the processor further configured to generate a second digital certificate for a client public key corresponding to the private key generated by the client device and transmitting the second digital certificate to the server after validating the digital certificate received from the server.

FIG. 1 is a block diagram of a computing device according to some of the example embodiments.

In the illustrated embodiment, a computing device 100 includes a processor 102, network interface 104, storage device 106, key generator 112, and a physically unclonable function 114. In the illustrated embodiment, computing device 100 can be configured to perform some of all of the operations described in FIG. 2, which are not repeated herein. In some embodiments, the computing device 100 can comprise a client or server as used in the description of FIG. 2.

In an embodiment, the storage device 106 stores data including, but not limited to, keys 108 and certificates 110. In some embodiments, the storage device 106 can comprise a secure storage device such as a hardware security module (HSM). Alternatively, or in conjunction with the foregoing, the storage device 106 can comprise a general-purpose storage device with a dedicated area for secure storage (e.g., a write-protected region). In some embodiments, the storage device 106 can store other non-sensitive data (e.g., user data, operating systems, etc.). In some embodiments, the storage device 106 can comprise a Flash memory device or similar persistent storage device.

In an embodiment, the keys 108 can comprise asymmetric key pairs. In some embodiments, the asymmetric key pairs can comprise ECDH key pairs. In some embodiments, the ECDH key pairs can be written to storage device 106 during manufacturing of the storage device 106 or computing device 100. Alternatively, in some embodiments, the computing device 100 can generate its own ECDH keys. In some embodiments, a private key of an ECDH key-pair can be stored securely, while the public key portion can be stored in any storage area.

In an embodiment, the certificates 110 comprise digital certificates. In some embodiments, the digital certificates can be issued by a certificate authority (CA) or a similar trusted party. In some embodiments, the digital certificates can be self-signed. In some embodiments, the digital certificates can be associated with key pairs in the keys 108. In some embodiments, the digital certificates can be stored in a secure location. Alternatively, or in conjunction with the foregoing, the digital certificates can be stored in any storage area of the computing device 100.

In an embodiment, a key generator 112 can be configured to generate keys. In some embodiments, the key generator 112 can generate both asymmetric and symmetric keys and key pairs, including ECDH key pairs. The key generator 112 can implement any secure algorithm for generating keys. In some embodiments, the key generator 112 can generate keys using a value supplied by physically unclonable function 114.

In one embodiment, the computing device 100 can include a physically unclonable function 114. In the illustrated embodiment, the physically unclonable function 114 may comprise a physical hardware circuit that exploits inherent randomness introduced during manufacturing to give a physical entity a unique 'fingerprint' or trust anchor. In the illustrated embodiment, the physically unclonable function 114 produces a consistent and repeatable value. In some embodiments, the physically unclonable function 114 may comprise a static random-access memory (SRAM), physically unclonable function (PUF), Delay PUF, or any other PUF technology implemented on the computing device 100. In the illustrated embodiment, the key generator 112 can read a PUF value from physically unclonable function 114 and use the PUF value as a seed value during key generation. In some embodiments, the key generator 112 can write (or overwrite) keys 108.

In the illustrated embodiment, processor 102 can be configured to handle TLS handshakes. That is, processor 102 can be configured to access keys 108 and certificates 110 to generate packets for transmission to an external device during the handshake process. In an embodiment, the processor 102 can communicate with other such devices via network interface 104. Details of completing a TLS handshake are provided in FIG. 2 and are not repeated herein.

Figure 2:
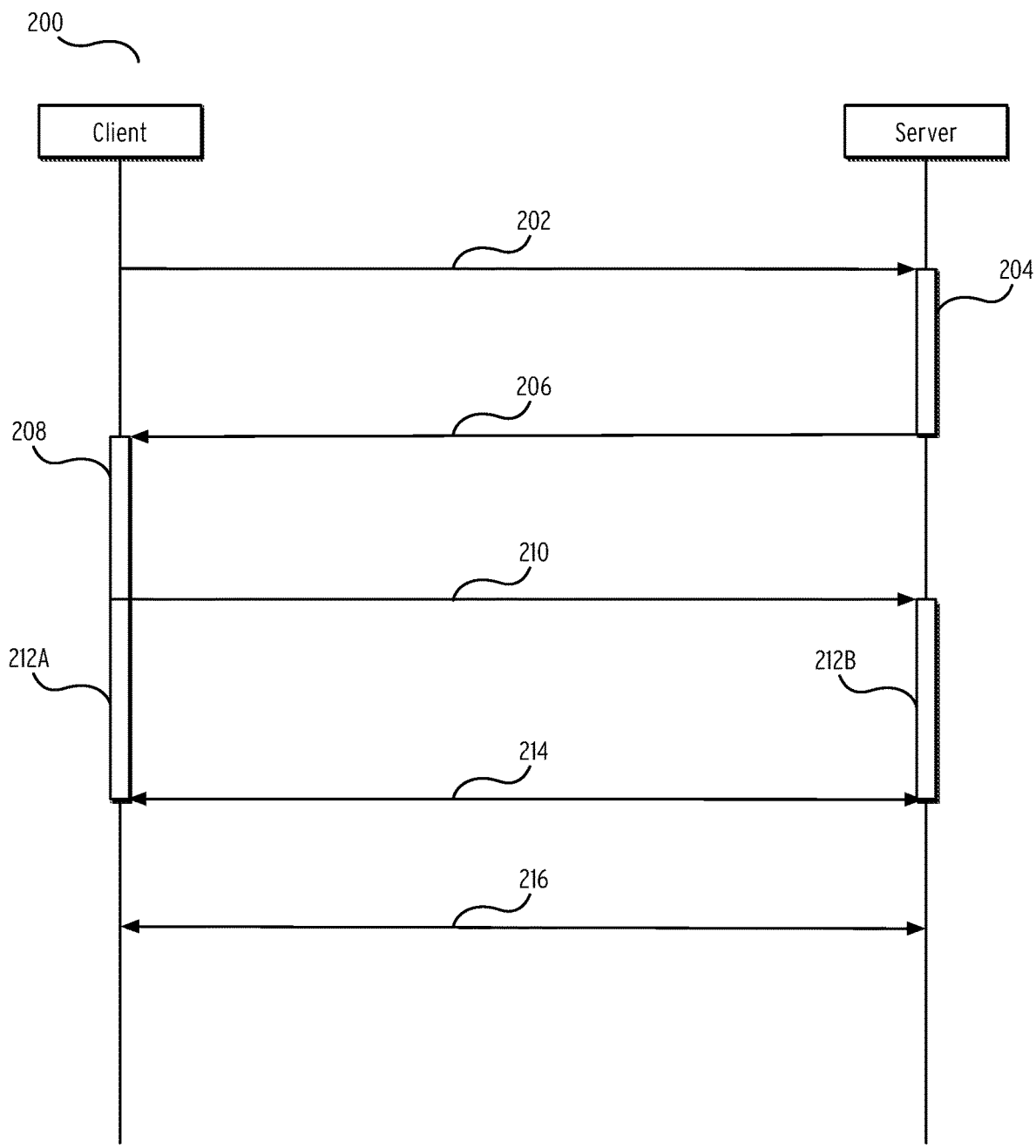
FIG. 2 is a flow diagram illustrating a method for establishing a secure channel according to some of the example embodiments.

FIG. 2 is a flow diagram illustrating a method 200 for establishing a secure channel according to some of the example embodiments.

In step 202, method 200 can include a client device transmitting a message to a server. In an embodiment, the message in step 202 can include a ClientHello message issued to initiate a TLS handshake. In some embodiments, the message can include a protocol version, random value (referred to as the "client random"), and a list of cipher suites. In some embodiments, the list of cipher suites can include a special cipher suite string that identifies use ECDH certificate exchanges.

In step 204, method 200 reads a digital certificate and, in step 206, transmits the digital certificate to the client device.

In some embodiments, the digital certificate can comprise a digital certificate associated with an ECDH key pair associated with the server (referred to as an ECDH digital certificate).

As used herein, an ECDH key pair comprises a public key and a private key generated using a set of input parameters. Examples of input parameters can comprise domain parameters of an agreed-upon elliptic curve in a finite field such as a prime number defined for the field (p), curve coefficient (a, b), generator point G, order of the elliptic curve (n), and cofactor of the elliptic curve (h). In some embodiments, these input parameters can form part of a named curve. In some embodiments, the private key portion (d) can comprise a random number in the range [0,n). In some embodiments, the public key portion (Q) can be computed as d*G. For two parties (e.g., a client and server), the input parameters can be shared in plaintext, and each device can independently generate ECDH key pairs ($d_c$, $Q_c$) at the client and ($d_s$, $Q_s$) at the server.

In some embodiments, the ECDH key pair can comprise a pre-generated ECDH key pair. In other embodiments, the ECDH key pair can be generated in an ad hoc manner (e.g., on-demand). In some embodiments, the ECDH key pair can be generated and/or stored in a storage device (e.g., Flash storage) communicatively coupled to the server. In some embodiments, such a storage device can store the ECDH key pair in a secure location (e.g., hardware security module, write-protected memory, etc.) to prevent tampering.

In some embodiments, an ECDH digital certificate can comprise an X.509 digital certificate. In some embodiments, an ECDH digital certificate can include a field indicating that usage of the key included in the digital certificate can be used for key agreement. For example, when implemented as an X.509 certificate, a key usage bit string can be configured to indicate usage of the public key for key agreement. For example, bit position four of the KeyUsage bit string can be set to one.

In some embodiments, the ECDH digital certificate can be generated by the server (or another computing device trusted by the server). Specifically, an owner of the server can cause a computing device to generate a certificate signing request (CSR) and issue the CSR to a CA which can generate the ECDH digital certificate. In some embodiments, a self-signed ECDH digital certificate can be used. In some embodiments, the ECDH digital certificate can be generated by an entity other than the owner of the server or ECDH key pair storage device. In some embodiments, the ECDH digital certificate can be stored in a secure location of a memory device. However, in other embodiments, the ECDH digital certificate can be stored in any location convenient for the server.

In some embodiments, in step 204, method 200 can additionally include other data alongside the digital certificate. For example, method 200 can transmit a selected cipher suite and a random value (referred to as the "server random"). In some embodiments, the server random can be transmitted in plain text to the client device. In an alternative embodiment, method 200 can transmit the server random as a separate transmission (not illustrated) rather than along with the digital certificate. In yet another alternative, method 200 can include the server random as an additional expression of the digital certificate, which prevents tampering with the server random value.

In step 208, method 200 can include validating the ECDH digital certificate. In some embodiments, the client can validate the ECDH digital certificate. In an embodiment, the client can validate the ECDH digital certificate using a public key of the CA that generated the digital certificate. After validating the ECDH digital signature, the client can read the ECDH public key. After validating the ECDH digital signature, the client can transmit its own DH parameter (e.g., public key) in plaintext to the server in step 210.

After step 210, method 200 can include the client and server independently generating a premaster secret in step 212A and step 212B, respectively.

Specifically, the client uses its private key and the public key extracted from the ECDH digital certificate to generate the premaster secret, while the server uses its private key and the client's DH parameter to generate the premaster secret. In some embodiments, step 212A and step 212B can both further include independently generating a session key at the client and server independently. Any session key generation algorithm (e.g., AES) can be used to generate the session key provided it is agreed upon during the TLS handshake.

As discussed above, in step 210, the client has cleartext versions of $d_c$, $Q_c$, and $Q_s$ while the server has a cleartext version of $d_s$, $Q_s$, and $Q_c$. In step 210, the client can compute a premaster secret as $d_c*Q_s$ while the server can compute a premaster secret as $d_s*Q_c$. Given the complexity of computing $d_s$ or $d_c$ by brute force attack, method 200 can transmit the corresponding public keys in plaintext and without an additional encryption operation as in existing DHE protocols. Further, a digital certificate is used to verify the authenticity of $Q_s$ when transmitting the public key.

In step 214, method 200 can include the client and server, both indicating to one another that the session keys were successfully generated. After this acknowledgment, in step 216, method 200 can include encrypting and decrypting data using the session key and transferring data between the client and server.

While the foregoing embodiments utilize TLS, the same methods can equally be applied to a mutual TLS (mTLS) session. Specifically, the client can be configured to generate and transmit its own ECDH digital certificate to the server after step 208 (e.g., similar to step 204 and step 206). The server can then be configured to validate the client's ECDH digital certificate and proceed to generate a premaster secret.

In contrast to method 200, existing TLS handshake procedures generally return a higher-level digital certificate in a response message (e.g., in step 206). For example, a server may return an ECDSA certificate since the underlying ECDSA key pair is used to encrypt/decrypt messages over the secure channel. Only after this certificate exchange (and verification) are ECDH keys sent from the server to the client. Notably, however, in existing TLS handshakes, any ECDH keys are transmitted in encrypted form, encrypted using the ECDSA private key.

Specifically, in existing implementations of DHE key exchange, the server must reply with a TLS certificate (containing, for example, an ECDSA a public encryption key), which is validated. Then, the server transmits a second message that includes the encrypted server-side DH parameter (as well as encrypted client random and server random) to prove ownership of the private encryption key. This, then, requires the client to decrypt the second message to obtain the server's DH parameter. Thus, the client must perform two asymmetric cryptography operations: validating the TLS certificate and then decrypting the server's DH parameter.

The aforementioned method removes the decryption of the DH parameter used in ECDH key exchange.

The foregoing embodiments greatly reduce the processing required of the server device. Specifically, in existing implementations of ephemeral Diffie-Hellman handshakes, a server will generally respond with an SSL certificate.

Figure 3:
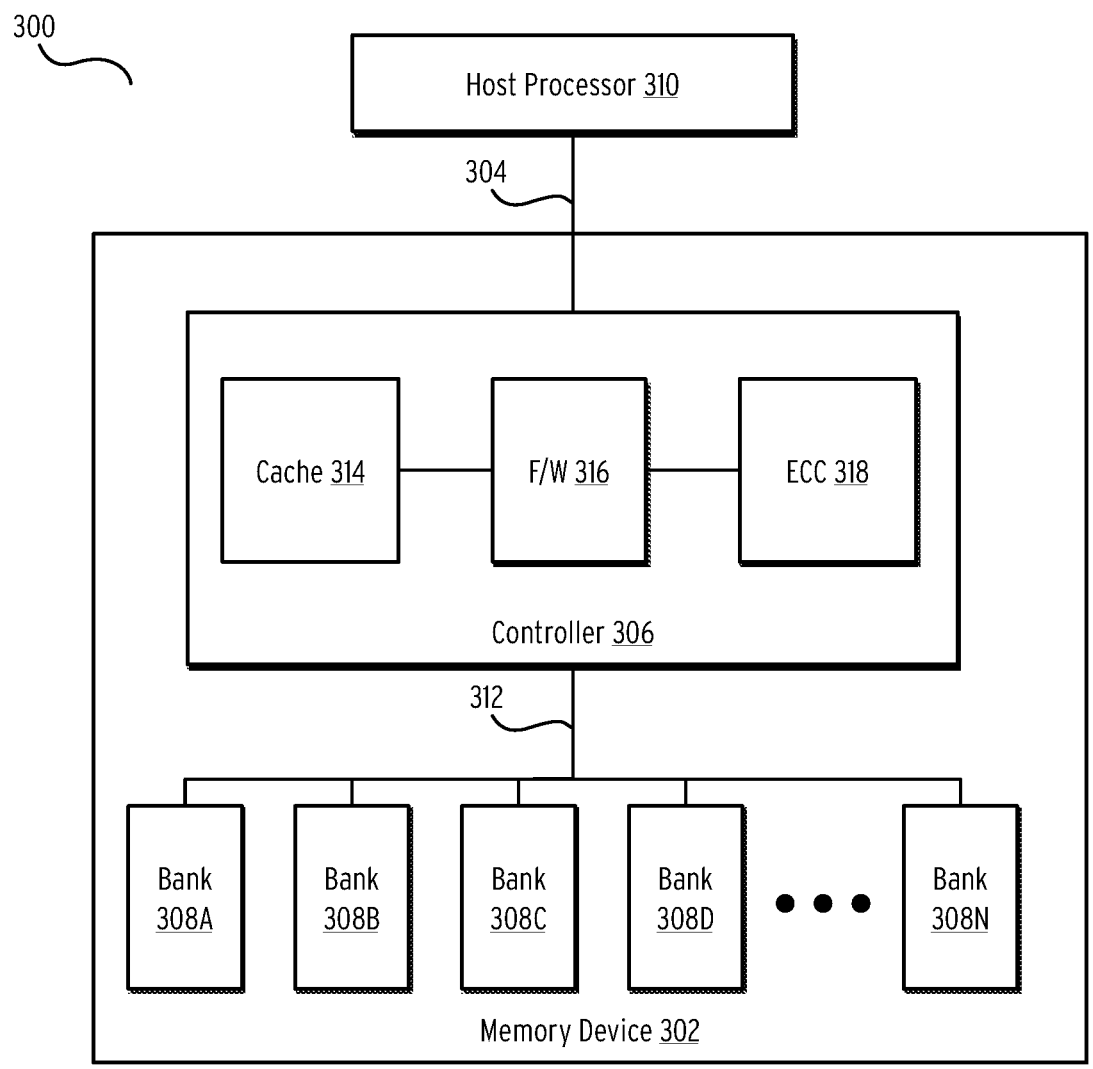
FIG. 3 is a block diagram illustrating a memory system according to some of the example embodiments.

FIG. 3 is a block diagram illustrating a memory system according to some embodiments of the disclosure.

As illustrated in FIG. 3, a computing system 300 includes a host processor 310 communicatively coupled to a memory device 302 via a bus 304. The memory device 302 comprises a controller 306 communicatively coupled to one or more memory banks (e.g., bank 308A, bank 308B, bank 308C, bank 308D, bank 308N, etc.) forming a memory array via an interface 312. As illustrated, the controller 306 includes a local cache 314, firmware 316, and an ECC module 318.

In the illustrated embodiment, host processor 310 can comprise any type of computer processor, such as a central processing unit (CPU), graphics processing unit (GPU), or other types of general-purpose or special-purpose computing devices. The host processor 310 includes one or more output ports that allow for the transmission of address, user, and control data between the host processor 310 and the memory device 302. In the illustrated embodiment, this communication is performed over the bus 304. In one embodiment, the bus 304 comprises an input/output (I/O) bus or a similar type of bus.

The memory device 302 is responsible for managing one or more memory banks (e.g., bank 308A, bank 308B, bank 308C, bank 308D, bank 308N, etc.). In one embodiment, the memory banks (e.g., bank 308A, bank 308B, bank 308C, bank 308D, bank 308N, etc.) comprise NAND Flash dies or other configurations of non-volatile memory. In one embodiment, the memory banks (e.g., bank 308A, bank 308B, bank 308C, bank 308D, bank 308N, etc.) comprise a memory array.

The memory banks (e.g., bank 308A, bank 308B, bank 308C, bank 308D, bank 308N, etc.) are managed by the controller 306. In some embodiments, the controller 306 comprises a computing device configured to mediate access to and from banks (e.g., bank 308A, bank 308B, bank 308C, bank 308D, bank 308N, etc.). In one embodiment, the controller 306 comprises an ASIC or other circuitry installed on a printed circuit board housing the memory banks (e.g., bank 308A, bank 308B, bank 308C, bank 308D, bank 308N, etc.). In some embodiments, the controller 306 may be physically separate from the memory banks (e.g., bank 308A, bank 308B, bank 308C, bank 308D, bank 308N, etc.). The controller 306 communicates with the memory banks (e.g., bank 308A, bank 308B, bank 308C, bank 308D, bank 308N, etc.) over the interface 312. In some embodiments, this interface 312 comprises a physically wired (e.g., traced) interface. In other embodiments, the interface 312 comprises a standard bus for communicating with memory banks (e.g., bank 308A, bank 308B, bank 308C, bank 308D, bank 308N, etc.).

The controller 306 comprises various modules including local cache 314, firmware 316 and ECC module 318. In one embodiment, the various modules (e.g., local cache 314, firmware 316 and ECC module 318) comprise various physically distinct modules or circuits. In other embodiments, the modules (e.g., local cache 314, firmware 316 and ECC module 318) may completely (or partially) be implemented in software or firmware.

As illustrated, firmware 316 comprises the core of the controller and manages all operations of the controller 306. The firmware 316 may implement some or all of the methods described above. Specifically, the firmware 316 may implement the methods described in the foregoing figures.

Figure 4:
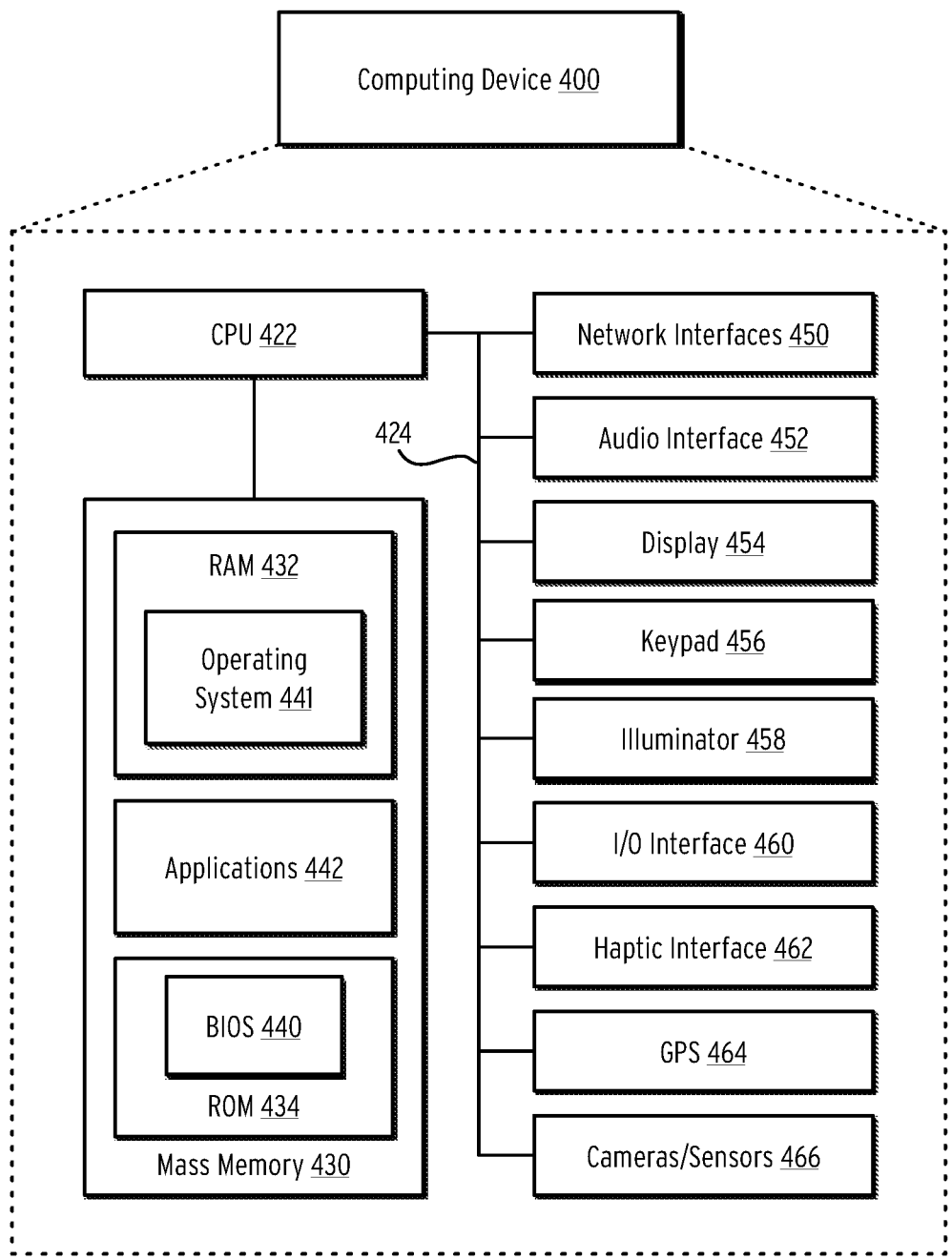
FIG. 4 is a block diagram illustrating a computing device showing an example embodiment of a computing device according to some of the example embodiments.

FIG. 4 is a block diagram illustrating a computing device 400 showing an example embodiment of a computing device used in the various embodiments of the disclosure.

The computing device 400 may include more or fewer components than those shown in FIG. 4. For example, a server computing device may not include audio interfaces, displays, keypads, illuminators, haptic interfaces, GPS receivers, cameras, or sensors.

As shown in the figure, the computing device 400 includes a processing unit such as CPU 422 in communication with a mass memory 430 via a bus 424. The computing device 400 also includes one or more network interfaces 450, an audio interface 452, a display 454, a keypad 456, an illuminator 458, an input/output interface 460, a haptic interface 462, a Global Positioning System transceiver (GPS transceiver 464) and one or more sensors 466, such as cameras or other optical, thermal, or electromagnetic. The positioning of the one or more sensors 466 on the computing device 400 can change per computing device 400 model, per computing device 400 capabilities, and the like, or some combination thereof.

The computing device 400 may optionally communicate with a base station (not shown) or directly with another computing device. A network interface is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises input/output interface 460 for communicating with external devices, using communication technologies, such as USB, infrared, Bluetooth™, or the like. The haptic interface 462 provides tactile feedback to a user of the client device.

The GPS transceiver 464 can determine the physical coordinates of the computing device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS, or the like, to further determine the physical location of the computing device 400 on the surface of the Earth. In one embodiment, however, the computing device 400 may, through other components, provide other information that may be employed to determine a physical location of the device, including, for example, a MAC address, Internet Protocol (IP) address, or the like.

Mass memory 430 includes a RAM 432, a ROM 434, and other storage means. Mass memory 430 illustrates another example of computer storage media for storage of information such as computer-readable instructions, data structures, program modules, or other data. Mass memory 430 stores a basic input/output system (BIOS 440) for controlling the low-level operation of the computing device 400. The mass memory also stores an operating system 441 for controlling the operation of the computing device 400

Applications 442 may include computer-executable instructions which, when executed by the computing device 400, perform any of the methods (or portions of the methods) described previously in the description of the preceding Figures. In some embodiments, the software or programs implementing the method embodiments can be read from hard disk drive (not illustrated) and temporarily stored in RAM 432 by CPU 422. CPU 422 may then read the software or data from RAM 432, process them, and store them to RAM 432 again.

The disclosure includes various devices which perform the methods and implement the systems described above, including data processing systems which perform these methods, and computer-readable media containing instructions which, when executed on data processing systems, cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to "one" or "an" embodiment in the present disclosure do not necessarily reference the same embodiment and such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments, but not other embodiments.

In this description, various functions and operations may be described as being performed by or caused by software code to simplify description. However, those skilled in the art will recognize what is meant by such expressions is that the functions result from the execution of the code by one or more processors, such as a microprocessor, Application-Specific Integrated Circuit (ASIC), graphics processor, or a Field-Programmable Gate Array (FPGA). Alternatively, or in combination, the functions and operations can be implemented using special-purpose circuitry (e.g., logic circuitry), with or without software instructions. Embodiments can be implemented using hardwired circuitry without software instructions or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system, middleware, service delivery platform, Software Development Kit (SDK) component, web services, or other specific application, component, program, object, module, or sequence of instructions referred to as "computer programs." Invocation interfaces to these routines can be exposed to a software development community as an Application Programming Interface (API). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places, including, for example, ROM, volatile RAM, non-volatile memory, or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD-ROM), Digital Versatile Disks (DVD), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or mobile devices, a user terminal, a vehicle, a personal communications device, a wearable digital device, an electronic kiosk, a general-purpose computer, an electronic document reader, a tablet, a laptop computer, a smartphone, a digital camera, a residential, domestic appliance, a television, or a digital music player. Additional examples of computing devices include devices that are part of what is called the IoT. Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, and/or a combination of communication connections.

In some embodiments, the computing device is a system including one or more processing devices. Examples of the processing device can include a microcontroller, a CPU, special purpose logic circuitry (e.g., an FPGA, an application-specific integrated circuit (ASIC), etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

I claim:

1. A method comprising:
   issuing, by a client device to a server, a request to initiate a secure transport layer security (TLS) connection, the client device comprising a lightweight computing device;
   receiving, by the client device, a response to the request to initiate the secure TLS connection from the server, the response comprising a ServerHello message including a digital certificate associated with an Elliptic-Curve Diffie-Hellman (ECDH) public key stored by the server, the digital certificate including the ECDH public key and an unencrypted Diffie-Hellman (DH) parameter, the digital certificate further including a key usage field indicating the ECDH public key is for key agreement, wherein the ECDH public key is associated with a static ECDH key pair of the server;
   validating, by the client device, the digital certificate included in the response to the request to initiate the TLS connection;
   computing, by the client device, a pre-master secret using the ECDH public key included in the response and a private key generated by the client device;
   generating, by the client device, an ephemeral ECDH key pair;
   computing, by the client device, a pre-master secret using the static ECDH public key and the ephemeral private key generated by the client device;
   deriving, by the client device, a session key from the pre-master secret using a key derivation function that incorporates a client random value and a server random value;
   establishing, by the client device, the secure TLS connection after computing the pre-master, the establishing the secure TLS connection including: encrypting, by the client device, a payload using the pre-master secret, and transmitting the payload to the server; and
   erasing, by the client device, the ephemeral private key after the secure TLS connection is established.

2. The method of claim 1, wherein the request to initiate the secure TLS connection comprises a ClientHello message.

3. The method of claim 1, wherein the digital certificate associated with a public key stored by the server is signed by a trusted certificate authority.

4. The method of claim 1, wherein the digital certificate associated with a public key stored by the server includes a key usage bit string configured to indicate usage of the public key for key agreement.

5. The method of claim 1, further comprising generating a second digital certificate for a client public key corresponding to the private key generated by the client device and transmitting the second digital certificate to the server after validating the digital certificate received from the server.

6. The method of claim 1, further comprising encrypting, by the client device, a session communication using the pre-master secret.

7. A non-transitory computer-readable storage medium for tangibly storing computer program instructions capable of being executed by a computer processor, the computer program instructions defining steps of:

issuing, by a client device to a server, a request to initiate a secure transport layer security (TLS) connection, the client device comprising a lightweight computing device;

receiving, by the client device, a response to the request to initiate the secure TLS connection from the server, the response comprising a ServerHello message including a digital certificate associated with an Elliptic-Curve Diffie-Hellman (ECDH) public key stored by the server, the digital certificate including the ECDH public key and an unencrypted Diffie-Hellman (DH) parameter, the digital certificate further including a key usage field indicating the ECDH public key is for key agreement, wherein the ECDH public key is associated with a static ECDH key pair of the server;

validating, by the client device, the digital certificate included in the response to the request to initiate the TLS connection;

computing, by the client device, a pre-master secret using the ECDH public key included in the response and a private key generated by the client device;

generating, by the client device, an ephemeral ECDH key pair;

computing, by the client device, a pre-master secret using the static ECDH public key and the ephemeral private key generated by the client device;

deriving, by the client device, a session key from the pre-master secret using a key derivation function that incorporates a client random value and a server random value;

establishing, by the client device, the secure TLS connection after computing the pre-master secret, the establishing the secure TLS connection including: encrypting, by the client device, a payload using the pre-master secret, and transmitting the payload to the server; and erasing, by the client device, the ephemeral private key after the secure TLS connection is established.

8. The non-transitory computer-readable storage medium of claim 7, wherein the request to initiate the secure TLS connection comprises a ClientHello message.

9. The non-transitory computer-readable storage medium of claim 7, wherein the digital certificate associated with a public key stored by the server is signed by a trusted certificate authority.

10. The non-transitory computer-readable storage medium of claim 7, wherein the digital certificate associated with a public key stored by the server includes a key usage bit string configured to indicate usage of the public key for key agreement.

11. The non-transitory computer-readable storage medium of claim 7, the steps further comprising generating a second digital certificate for a client public key corresponding to the private key generated by the client device and transmitting the second digital certificate to the server after validating the digital certificate received from the server.

12. The non-transitory computer-readable storage medium of claim 7, the steps further comprising encrypting, by the client device, a session communication using the pre-master secret.

13. A lightweight computing device comprising:
a processor configured to:

issue, to a server, a request to initiate a secure transport layer security (TLS) connection;

receiving a response to the request to initiate the secure TLS connection from the server, the response comprising a ServerHello message including a digital certificate associated with an Elliptic-Curve Diffie-Hellman (ECDH) public key stored by the server, the digital certificate including the ECDH public key and an unencrypted Diffie-Hellman (DH) parameter, the digital certificate comprising a digital certificate associated with an Elliptic-curve Diffie-Hellman (ECDH) key pair stored by the server, the digital certificate further including a key usage field indicating the ECDH public key is for key agreement, wherein the ECDH public key is associated with a static ECDH key pair of the server;

validating the digital certificate included in the response to the request to initiate the TLS connection;

computing a pre-master secret using the ECDH key included in the response and a private key generated by the device;

generating an ephemeral ECDH key pair;

computing a pre-master secret using the static ECDH public key and the ephemeral private key generated by the client device;

deriving a session key from the pre-master secret using a key derivation function that incorporates a client random value and a server random value;

establishing the secure TLS connection after computing the pre-master secret, the establishing the secure TLS connection including: encrypting a payload using the pre-master secret, and transmitting the payload to the server; and erasing, by the client device, the ephemeral private key after the secure TLS connection is established.

14. The device of claim 13, wherein the request to initiate the secure TLS connection comprises a ClientHello message and the response to the request includes a ServerHello message.

15. The device of claim 13, wherein the digital certificate associated with a public key stored by the server is signed by a trusted certificate authority.

16. The device of claim 13, wherein the digital certificate associated with a public key stored by the server includes a key usage bit string configured to indicate usage of the public key for key agreement.

17. The device of claim 13, the processor further configured to generate a second digital certificate for a client public key corresponding to the private key generated by the device and transmitting the second digital certificate to the server after validating the digital certificate received from the server.

* * * * *